United States Patent
Lalys et al.

(10) Patent No.: US 11,900,620 B2
(45) Date of Patent: Feb. 13, 2024

(54) METHOD AND SYSTEM FOR REGISTERING IMAGES CONTAINING ANATOMICAL STRUCTURES

(71) Applicant: THERENVA, Rennes (FR)

(72) Inventors: Florent Lalys, Rennes (FR); Mathieu Colleaux, Rennes (FR); Vincent Gratsac, Thorigné-Fouillard (FR)

(73) Assignee: THERENVA, Rennes (FR)

( * ) Notice: Subject to any disclaimer, the term of this patent is extended or adjusted under 35 U.S.C. 154(b) by 291 days.

(21) Appl. No.: 17/324,633

(22) Filed: May 19, 2021

(65) Prior Publication Data

US 2021/0366135 A1  Nov. 25, 2021

(30) Foreign Application Priority Data

May 20, 2020 (FR) ...................... 2005371

(51) Int. Cl.
*G06F 18/2431* (2023.01)
*G06T 7/33* (2017.01)

(52) U.S. Cl.
CPC ............ *G06T 7/33* (2017.01); *G06F 18/2431* (2023.01); *G06T 2200/04* (2013.01);
(Continued)

(58) Field of Classification Search
CPC ........................................................ G06T 7/33
See application file for complete search history.

(56) References Cited

U.S. PATENT DOCUMENTS

2017/0337682 A1*  11/2017  Liao ..................... A61B 5/7267
2018/0042566 A1*  2/2018  Roffe ................... A61B 6/4441
(Continued)

FOREIGN PATENT DOCUMENTS

| DE | 10323008 A1 | 12/2004 |
|---|---|---|
| EP | 3121789 A1 | 1/2017 |
| WO | 03088143 A2 | 10/2003 |

OTHER PUBLICATIONS

French Search Report and Written Opinion dated Jan. 20, 2021 for corresponding French Application No. 2005371, filed May 20, 2020.

(Continued)

*Primary Examiner* — Oneal R Mistry
(74) *Attorney, Agent, or Firm* — David D. Brush; Westman, Champlin & Koehler, P.A.

(57) ABSTRACT

A method for registration between a first three-dimensional image acquired according to a first acquisition mode, and including anatomical structures of a patient, and a second two-dimensional image, acquired according to a second acquisition mode by a rotatable and translatable device, the second image including a portion of the anatomical structures of the patient. The registration implements a rigid spatial transformation defined by rotation and translation parameters. The method includes automatically detecting the anatomical structures in the two-dimensional image by applying a first detection neural network trained on a generic database; estimating, from the anatomical structures automatically detected in the second two-dimensional image, by applying at least one classification neural network trained beforehand on a generic database, the rotation and translation parameters of the rigid spatial transformation; and 3D/2D iconic registration between the first three-dimensional image and the second two-dimensional image starting from an initialization with the rigid spatial transformation.

11 Claims, 4 Drawing Sheets

(52) U.S. Cl.
CPC .............. *G06T 2207/10064* (2013.01); *G06T 2207/10081* (2013.01); *G06T 2207/10088* (2013.01); *G06T 2207/20084* (2013.01); *G06T 2207/20221* (2013.01); *G06T 2207/30101* (2013.01); *G06V 2201/03* (2022.01)

(56) References Cited

U.S. PATENT DOCUMENTS

2019/0050999 A1  2/2019  Piat et al.
2022/0058797 A1* 2/2022  Blau ................... A61B 6/5211

OTHER PUBLICATIONS

English translation of Written Opinion of the French Searching Authority dated Jan. 20, 2021 for corresponding French Application No. 2005371, filed May 20, 2020.

Robert Grupp et al., "Automatic Annotation of Hip Anatomy in Fluroscopy for Robust and Efficient 2D/3D Registration", arxiv.org, Cornell University Library, 01 Olin Library Cornell University Ithaca, NY 14853, Nov. 16, 2019 (Nov. 16, 2019), XP081533959.

Li Yang et al., "C-arm based image-guided percutaneous puncture of minimally invasive spine surgery", 2017 10th International Congrass on Image and Signal Processing, Biomedical Engineering and Informatics (CISP-BMEI), IEEE Oct. 14, 2017 (Oct. 14, 2017), pp. 1-5, XP033326509.

Markelj P. et al., "A review of 3D/2D registration methods for image-guided interventions", Medical Image Analysis, Oxforduniversity Press, Oxford, GB, vol. 16, No. 3, Apr. 2012 (Apr. 2012), pp. 642-661, XP002696430.

Maintz J B A et al., "A Survey of Medical Image Registration" Medical Image Alalysis, Oxforduniversity Press, Oxford, GB, vol. 2, No. 1, 1998, pp. 1-37, XP001032679.

* cited by examiner

[Fig. 1]
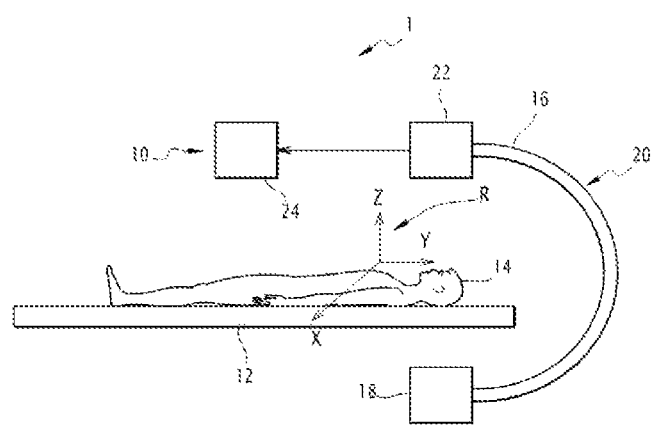

[Fig. 2]
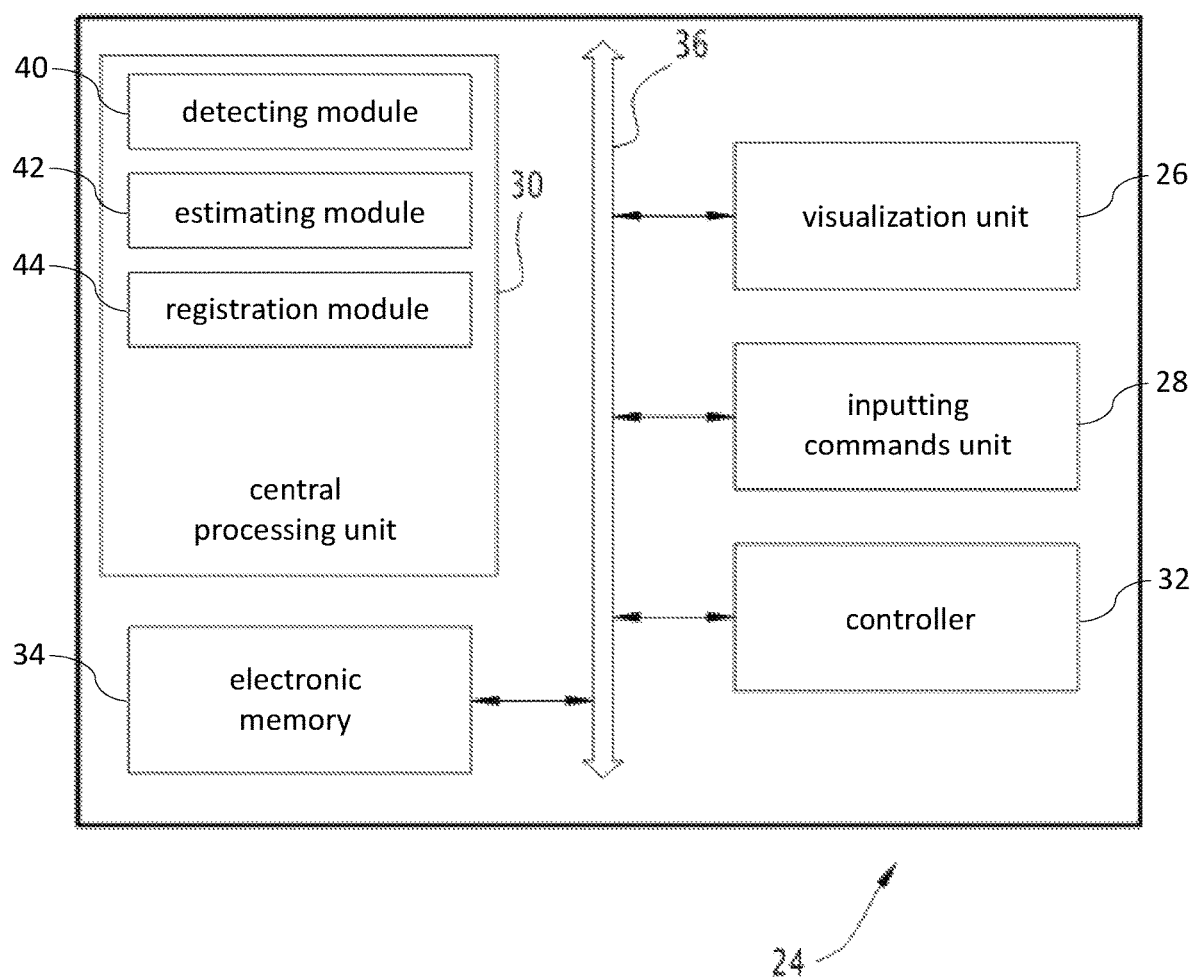

[Fig. 3]
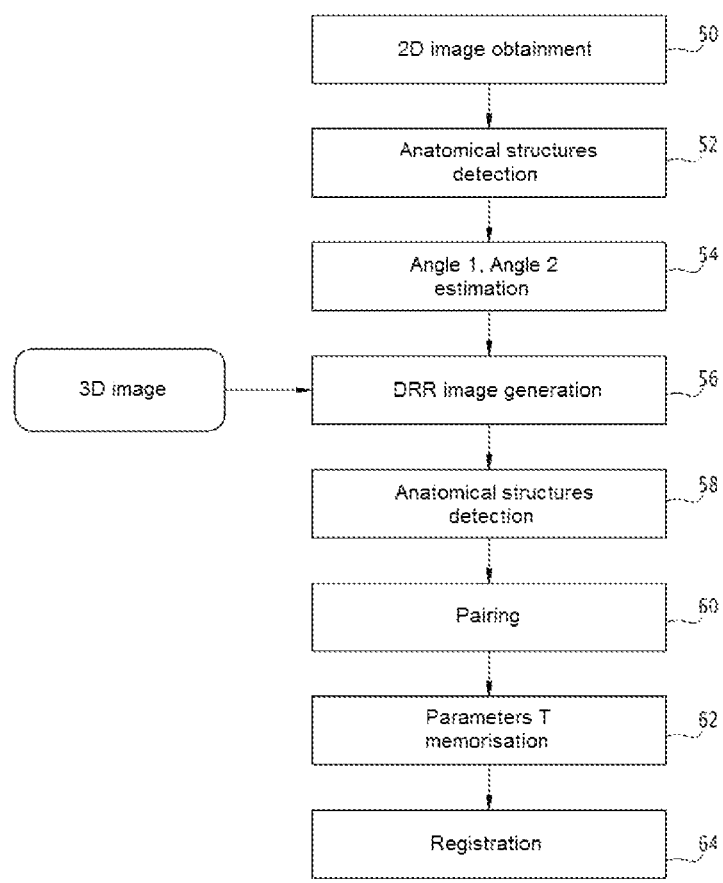

[Fig. 4]
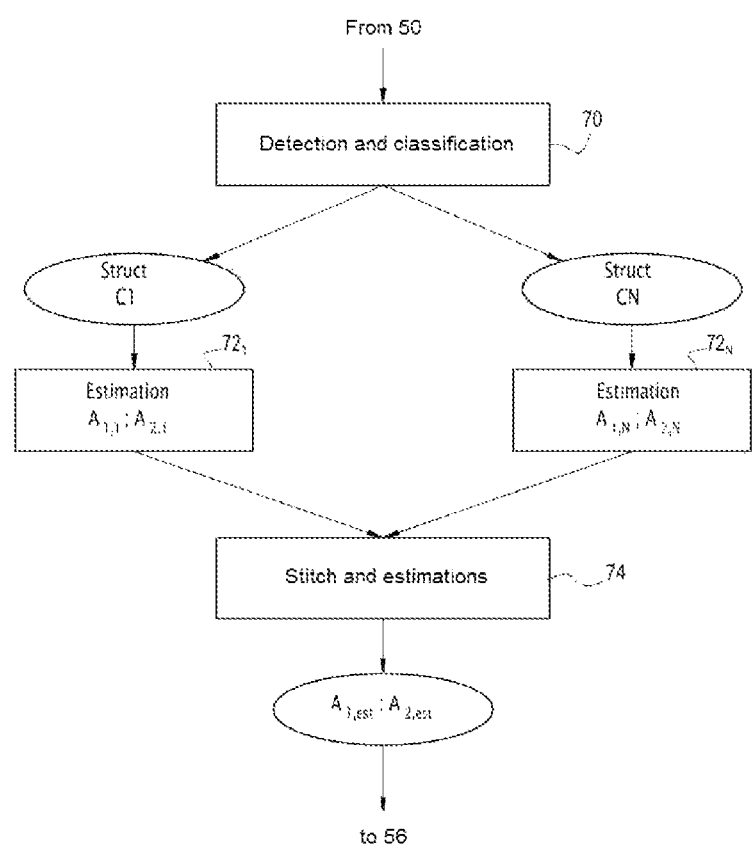

METHOD AND SYSTEM FOR REGISTERING IMAGES CONTAINING ANATOMICAL STRUCTURES

FIELD OF THE DISCLOSURE

The present disclosure relates a method for registration between a first three-dimensional image acquired according to a first acquisition mode, and comprising anatomical structures of a patient and a second two-dimensional image, acquired according to a second acquisition mode.

The present disclosure also relates to an associated system for registering images.

The present disclosure finds particular application in the medical imaging field.

BACKGROUND OF THE DISCLOSURE

For many years, medical imaging techniques have been developed, in particular in the field of surgical interventions, to enable interventions that are as less invasive as possible.

Conventionally, in order to improve the assistance provided during the surgical phase, it has been suggested to use three-dimensional image data (or 3D images), acquired during a preoperative phase or planning phase, obtained by acquisition techniques such as tomography, also called CT, standing for "computed tomography", or magnetic resonance imaging (MRI). Indeed, quite often, the two-dimensional information regarding the organs is not sufficient and the surgeries require a three-dimensional knowledge. These 3D images are acquired before the surgery for diagnosis of the disease.

During the intervention, in the so-called intraoperative phase, two-dimensional images are acquired in real-time, by radiography, for example by fluoroscopy or by angiography.

The exploitation of the three-dimensional information generated in the preoperative phase during the intraoperative navigation requires matching of the three-dimensional image acquired according to a first acquisition mode (or first modality) with the two-dimensional (2D) image acquired during the intervention phase, according to a second acquisition mode (or second modality). The matching is performed thanks to a registration process which allows expressing the different data in the same spatial reference frame.

After the spatial registration, the preoperative and intra-operative images may be stitched and displayed to provide information easily interpretable by the surgeon.

There are image-guided surgical systems intended for so-called hybrid operating rooms, comprising a movable image acquisition device comprising a support of an image acquisition device adapted to turn around the patient for image acquisition, for example by X rays. For example, such a support device, known under the name of motor-driven rotational C-arm, is used in rotational angiography. When the device is motor-driven, the update of the registration between preoperative images and intraoperative images may be fully automated, and the operator can easily change the angles of the C-arm or move the table of the patient without jeopardizing the image stitch.

However, the use of a motor-driven rotational C-arm is not practical in an operating room, and could hinder the movements of the practitioner. In addition, such equipment is expensive and many hospitals cannot be equipped with it.

In most cases, the operating rooms are equipped with a conventional C-arm, movable and non motor-driven, which is a lighter and less expensive equipment. The assistance objectives are the same as with the motor-driven C-arm, but the images stitching is no longer fully automated. In this case, the registration is performed between the 3D image acquired in the preoperative phase and the 2D images acquired during the surgery, and an update of the registration is necessary at each movement of the patient, of the table or of the C-arm device. Usually, when a conventional C-arm is used, an operator (for example, the surgeon) has to enter the relative spatial position of the C-arm relative to the patient to initialize the registration.

Indeed, obtaining a registration with a good accuracy between images of various modalities, by image processing technologies, is still a problem that is difficult to solve, to the extent that the image acquisition positions, with respect to the position of the patient, between the first acquisition and the second acquisition can differ quite substantially in terms of rotation, translation and zooming. For a good result of a registration algorithm using image processing, the images to be registered supplied at input should not exceed the operating margins of the registration algorithm in their relative position (translation, rotation).

SUMMARY

To this end, it is useful to apply an initialization of the registration by an initialization rigid spatial transformation, defined by 6 parameters (or 6 degrees of freedom) comprising translation parameters and rotation parameters. The application of such a transformation enables a first registration between the images, in order to successfully apply afterwards a second refining registration.

An exemplary embodiment of the present disclosure improves the registration by automatic determination of the parameters of the rigid spatial transformation, without any intervention of an operator. To this end, an exemplary embodiment provides, according to one aspect, a method for registration between a first three-dimensional image acquired according to a first acquisition mode, and comprising anatomical structures of a patient, and a second two-dimensional image, acquired according to a second acquisition mode by an image acquisition device mounted on a scoping arch movable in rotation and in translation, the second image comprising a portion of the anatomical structures of said patient, the registration implementing a rigid spatial transformation defined by rotation and translation parameters. This method is implemented by a processor of a programmable electronic device and is characterized in that it includes steps of:

automatic detection of the anatomical structures in the two-dimensional image by application of a first detection neural network; trained on a generic database, estimation, from the anatomical structures automatically detected in said second two-dimensional image, by application of at least one classification neural network trained beforehand on a generic database, of the rotation and translation parameters of said rigid spatial transformation, 3D/2D iconic registration between the first three-dimensional image and the second two-dimensional image starting from an initialization with said rigid spatial transformation.

Advantageously, an exemplary embodiment of the method allows automatically obtaining angles of rotation and translation parameters characterizing a rigid spatial transformation to be applied to register the first image and the second image in the same reference frame, with a first detection neural network and at least one second classification neural network, without requiring any specific training of the neural networks on data of the patient.

Advantageously, the used memory and computational resources are thus reduced.

The registration method according to one or more exemplary embodiments may also have one or more of the features hereinbelow, considered independently or according to any technically feasible combinations:

The anatomical structures are classified into a plurality of predetermined anatomical structure categories, and wherein the estimation of the parameters of the rigid transformation includes the implementation of a second classification neural network per anatomical structure category to obtain transformation parameters estimated per anatomical structure category.

The estimation includes:
- a first estimation, from anatomical structures automatically detected in said second two-dimensional image, by application of at least one classification neural network, of a first angle of rotation and of a second angle of rotation of said rigid spatial transformation, characterizing the position of the scoping arch,
- a second estimation of translational parameters, of a third angle of rotation and of a zoom factor of said rigid spatial transformation, the second estimation using the result of the first estimation.

A classification neural network is applied per anatomical structure category to obtain a first angle of rotation and a second angle of rotation estimated per anatomical structure category, the method further including a stitching of the first angles of rotation estimated per anatomical structure category to obtain said estimated first angle of rotation and a stitching of the second angles of rotation estimated per anatomical structure category to obtain said estimated second parameter.

Each stitch consists of an average value calculation or of a median value calculation.

The second estimation comprises:
- a generation of a third two-dimensional image obtained from the first three-dimensional image by applying said first and second angles of rotation,
- an automatic detection of anatomical structures on said third image, and
- a pairing between the structures of said second and third two-dimensional images to obtain said translation parameters, the third angle of rotation and the zoom factor of said rigid spatial transformation.

The detection of anatomical structures in said third two-dimensional image is performed by application of said first detection neural network.

The anatomical structures are bone structures obtained on a second two-dimensional image acquired by fluoroscopy.

The anatomical structures are vascular structures obtained on a second two-dimensional image acquired by angiography.

The first three-dimensional image is acquired according to a first acquisition mode among tomography, MRI, 3D sonography or cone beam computed tomography.

According to another aspect, an exemplary embodiment relates to a computer program including software instructions which, when they are implemented by a programmable electronic device, implement a method for registration between a first three-dimensional image acquired according to a first acquisition mode, and comprising anatomical structures of a patient, and a second two-dimensional image, acquired according to a second acquisition mode as briefly described hereinabove.

According to another aspect, an exemplary embodiment relates to a device for registration between a first three-dimensional image acquired according to a first acquisition mode, and comprising anatomical structures of a patient, and a second two-dimensional image, acquired according to a second acquisition mode by an image acquisition device mounted on a scoping arch movable in rotation and in translation, the second image comprising a portion of the anatomical structures of said patient, the registration implementing a rigid spatial transformation defined by rotation and translation parameters. This device includes a processor configured to implement:
- a module for automatic detection of the anatomical structures in the two-dimensional image by application of a first detection neural network; trained on a generic database,
- a module for estimating, from the anatomical structures automatically detected in said second two-dimensional image, by application of at least one classification neural network trained beforehand on a generic database, of the rotation and translation parameters of said rigid spatial transformation,
- a module for 3D/2D iconic registration between the first three-dimensional image and the second two-dimensional image starting from an initialization with said rigid spatial transformation.

The registration device is configured to implement the registration method as briefly described hereinabove, in all implementation variants thereof. According to another aspect, an exemplary embodiment relates to a system for registration between a first three-dimensional image acquired according to a first acquisition mode, and comprising anatomical structures of a patient, and a second two-dimensional image, acquired according to a second acquisition mode, the system including an image acquisition device mounted on a scoping arch movable in rotation and in translation, the second image comprising a portion of the anatomical structures of said patient, the registration implementing a rigid spatial transformation defined by rotation and translation parameters, and a device for registering images as briefly described hereinabove.

BRIEF DESCRIPTION OF THE DRAWINGS

Other features and advantages of exemplary embodiments of the disclosure will appear from the description that is provided hereinbelow, for indicative purposes and without limitation, with reference to the appended figures, among which:

FIG. 1 schematically represents an image acquisition system comprising a movable acquisition device;

FIG. 2 is a block diagram of the main blocks of a programmable device adapted to implement the method of an exemplary embodiment of the disclosure;

FIG. 3 is a flowchart of the main steps of a method for registering images according to one embodiment;

FIG. 4 is a flowchart of the steps of detecting anatomical structures and of estimating the angles of rotation in one embodiment.

DETAILED DESCRIPTION OF ILLUSTRATIVE EMBODIMENTS

FIG. 1 schematically illustrates an operating room 1, equipped with an image registration system 10, allowing providing assistance for the intervention.

For example, the intervention is an endovascular surgery.

The operating room 1 is equipped with an operating table 12, on which a patient 14 is represented.

The system 10 includes a radiography device 20, which is an image acquisition device movable in translation and in rotation around the operating table 12.

The device 20, known under the name "C-ARM mobile", includes a scoping arch 16, an X-ray source 18 and an X-ray reception and detection unit 22, positioned opposite the source 18.

This image acquisition device is adapted to capture images of the anatomical structures positioned between the X-ray source 18 and the reception and detection unit 22.

The scoping arch 16 is adapted to be turned according to a first angle of rotation, called cranial angle, and a second angle of rotation, called lateral angle, relative to the plane of the table 12. In addition, the C-arm mobile is adapted to be moved in translation around the table 12. A zoom factor is associated to shooting by the image acquisition device.

Thus, the image acquisition device 20 is adapted to capture radiographic two-dimensional (2D) images of various portions of the body of the patient. The acquired fluoroscopic or angiographic 2D images include anatomical structures of the patient: bone structures or vascular structures.

The system 10 also includes a programmable electronic device 24, including one or several processor(s), configured to implement an image registration method as described later on.

FIG. 2 illustrates the main blocks of a programmable electronic device 24 configured to implement the registration method as described in detail hereinafter.

The programmable electronic device 24, for example a computer, comprises a visualization unit 26, composed by one or several screen(s), a unit 28 for inputting the commands of an operator, for example a keyboard, a mouse, a touchpad or a contactless interface, for example with voice commands recognition. In one embodiment, the unit 28 is integrated into a touchscreen 26.

The programmable electronic device 24 further comprises a central processing unit 30, comprising one or several computing processor(s), adapted to execute computer program instructions when the device 24 is turned on. Optionally, the device 24 includes a controller 32, allowing sending commands and selecting elements remotely, for example by voice commands.

The device 24 also includes an electronic memory 34, adapted to store data and executable code instructions enabling the implementation of programs including code instructions adapted to implement the method according to an exemplary embodiment. The various functional blocks of the device 24 described hereinabove are connected via a communication bus 36.

The electronic memory 34 is adapted to memorize a first three-dimensional image of the anatomical structures of the patient 14, acquired according to a first acquisition mode, for example by scanner, MRI, 3D sonography or CBCT ("Cone Beam Computed Tomography").

The programmable electronic device 24 is adapted to receive second two-dimensional images of the patient 14, acquired according to a second acquisition mode, for example by fluoroscopy or angiography, by an image acquisition device 20.

A rigid spatial transformation defined by 6 parameters (or degrees of freedom) and allowing matching each second two-dimensional image with the first three-dimensional image, in a common reference frame, is determined by a registration method.

Preferably, the common reference frame is a 3D reference frame associated to the patient, for example the reference frame denoted R in FIG. 1.

The central processing unit 30 is configured to implement:
- a module 40 for detecting anatomical structures in the second two-dimensional image, by application of a first detection neural network,
- a module 42 for estimating from the detected anatomical structures, by application of at least one classification neural network trained on a generic database, the translation and rotation parameters of the rigid spatial transformation, and
- a 2D/3D iconic registration module 44 initialized using the rigid spatial transformation.

In one embodiment, the module 42 includes:
- a module for first estimation from the detected anatomical structures, by application of at least one classification neural network trained on a generic database, of a first angle of rotation and of a second angle of rotation, which are representative of the rotation of the scoping arch, and form two rotation parameters of the rigid spatial transformation,
- a module for second estimation of the other parameters of the rigid spatial transformation, using the first and second angles of rotation obtained from the first estimation module.

The determined six parameters, defining the registration rigid spatial transformation and corresponding to the six degrees of freedom of movement of the image acquisition device relative to the patient, are memorized.

In one embodiment, the modules 40, 42, 44 are implemented in the form of software instructions forming a computer program, which, when it is executed by a programmable device, implements an image registration method according to one or more of the embodiments of the disclosure.

In a variant, each of the modules 40, 42, 44 is made in the form of a programmable logical component, such as a FPGA (Field Programmable Gate Array), a GPU (graphical processor) or a GPGPU (General-purpose processing on graphics processing), or in the form of a dedicated integrated circuit, such as an ASIC (Application Specific Integrated Circuit).

The computer program including software instructions is further adapted to be recorded on a computer-readable medium. For example, the computer-readable medium is a medium adapted to memorize the electronic instructions and to be coupled to a bus of a computer system. As example, the readable medium is an optical disk, a magneto-optical disk, a ROM memory, a RAM memory, any type of read-only memory (for example EPROM, EEPROM, FLASH, NVRAM), a magnetic card or an optical card.

FIG. 3 represents the main steps implemented in a registration method according to one embodiment, implemented by a processor 30 of a programmable device 24.

An objective of the registration method is a registration in a common reference frame, for example a reference frame associated to the patient, of a first three-dimensional image, of a first modality, acquired in a preoperative phase and memorized, and of a second two-dimensional image, of a second modality, acquired by a movable acquisition device, subsequently to the acquisition of the first image, for example in an intraoperative phase.

The registration in a common reference frame is performed by the application of a rigid spatial transformation with 6 parameters (or 6 degrees of freedom).

The acquisition and the construction of the first three-dimensional image are performed for example by a tomography (CT), MRI, 3D sonography or CBCT ("Cone Beam Computed Tomography") technology.

The method includes a step 50 of obtaining a second two-dimensional image, for example acquired by radiography, for example by fluoroscopy or by angiography, by an image acquisition device 20 as described with reference to FIG. 1.

A step 52 of automatic detection of anatomical structures of the acquired two-dimensional image is applied, this detection implementing a first detection neural network.

For example, the anatomical structures are bone structures of the patient, including the vertebras, hip(s), etc.

Alternatively or complementarily, the detected anatomical structures are vascular structures including the aorta, the renal arteries, the iliac vessels, etc.

The detected anatomical structures are sorted in anatomical structure categories, i.e. vertebras, hips, sacrum, etc.

For example, the applied first detection neural network is a RCNN-type convolutional neural network (standing for Region-Based Convolutional Neural Network). A RCNN network starts by extracting interesting regions of the image thanks to a selective search. This selective search uses the structure of the image and splitting techniques to recover the relevant regions, i.e. the regions that comprise anatomical structures of the pursued anatomical structure categories. Afterwards, these relevant regions are used as input data for a conventional classification CNN network, for example with an AlexNet type architecture.

The parameters defining the detection neural network are obtained in a prior learning phase, performed on a generic learning image database, comprising two-dimensional images of the same modality as the second two-dimensional image acquired at step 50, for example obtained on a plurality of patients. Complementarily, the learning image database comprises synthetic images, also called DRR images standing for Digitally Reconstructed Radiographs, generated from 3D images by projection.

Advantageously, the learning image database is generic, it is not specific to the patient. It is calculated and memorized prior to the anatomical structures detection step 52.

On completion of the detection step 52, anatomical structures are detected and extracted from the second two-dimensional image, for example in the form of regions of interest (ROI), which are portions of images encompassing detected structures. For each category of detected anatomical structures, these regions of interest are input to a first estimation step 54, which performs the estimation of a first rotation parameter and of a second rotation parameter of the pursued rigid spatial transformation.

When the image acquisition device is a device as described with reference to FIG. 1, the first rotation parameter is a first angle of rotation, Angle 1, for example the cranial angle of the scoping arch (rotation about the axis X in the reference frame R of FIG. 1) and the second rotation parameter is a second angle of rotation, Angle 2, for example the lateral angle of the scoping arch (rotation about the axis Y in the 3D reference frame denoted R in FIG. 1). These first and second angles of rotation characterize the rotation of the scoping arch 16 relative to the plane of the table on which the patient is lying down (plane of the patient).

The estimation 54 of these angles of rotation is performed by implementation of at least one second neural network, such as a classification neural network, on the anatomical structures obtained at the detection step 52.

Preferably, a second classification neural network is applied for each anatomical structure category. Each second neural network has the same architecture but is defined by parameters obtained by training on regions of interest (ROI) encompassing anatomical structures of the same category.

For example, each second classification neural network has a structure of an AlexNet-type convolutional neural network. The parameters defining the classification neural network are obtained in a prior learning phase, for each class of distinct anatomical structures. The learning is performed on a generic database, comprising anatomical structures, for example bone structures, extracted from two-dimensional images for which the first and second angles of rotation of the image acquisition device are known. In addition, synthetic images generated from 3D images with known angles of rotation are also usable for learning.

Thus, for example, for the "Vertabras" category, a classification neural network of the first and second rotation parameters trained on a "vertebra"-type bone structure database is used, for the "Hips" category, a classification neural network of the first and second rotation parameters trained on a "hip"-type bone structure database is used, etc.

Advantageously, for each anatomical structure category, the learning image database is generic, it is not specific to the patient. It is calculated and memorized beforehand.

Values of the first angle of rotation Angle 1, and of the second angle of rotation Angle 2 are obtained and memorized on completion of the estimation step 54.

According to one variant, one single anatomical structure category is used for the estimation of the first angle of rotation and of the second angle of rotation.

According to another variant, one single second classification neural network, trained beforehand for a plurality of anatomical structure categories, on a generic database, is used for the estimation of the first angle of rotation and of the second angle of rotation.

Afterwards, the method includes a second estimation of the other four parameters that define the rigid spatial transformation, which are respectively two parameters of translation in the plane, a parameter of rotation in the plane and a zoom factor, the plane herein referring to the plane of the table 12. The second estimation is carried out by steps 56 to 60 described hereinafter.

Afterwards, the method includes a generation 56 of a third two-dimensional image, obtained by projection from the first 3D image memorized beforehand, according to the estimated first and second angles of rotation.

A second detection 58 of the anatomical structures, for example of the bone structures present in the third two-dimensional image, is implemented. The first detection neural network, used at the first detection step 52, is preferably also implemented in the second detection 58, and the detected anatomical structures are sorted in the anatomical structure categories.

The anatomical structures present in the third two-dimensional image are detected and located in this image on completion of the second detection 58.

Afterwards, the method includes a step 60 of pairing the anatomical structures detected respectively in the second two-dimensional image and in the third two-dimensional image, according to their category. The relative position of the paired anatomical structures and their size allow calculating two parameters of translation in the plane of these images, an angle of rotation in the plane and a zoom factor.

For the calculation of these parameters, in one embodiment, the centre of each detected structure is used to perform a structure-to-structure pairing, and a registration according to a geometric-type approach may be used to estimate the 4-parameter rigid transformation between the two images.

Thus, on completion of step 60, all of the pursued 6 parameters, defining the registration rigid spatial transformation, are known, comprising the first and second rotation parameters (Angle 1 and Angle 2) obtained at the first estimation step 54, a third rotation parameter obtained at step 60, as well as the translation parameters and the zoom factor obtained at step 60.

These rigid spatial transformation parameters are memorized at the parameters memorization step 62, and applied at a step 64 of 3D/2D registration between the first 3D image and the second 2D image.

The registration step 64 implements an initialization by application of the rigid spatial transformation defined by the memorized parameters, and, a local optimization of the registration. Any known registration method is applicable, but the registration will preferably be an iconic registration.

FIG. 4 represents in detail the main steps of the detection of the anatomical structures and of the estimation of the first and second rotation parameters according to one embodiment.

Step 50 of obtaining a second two-dimensional image is followed by a detection and classification step 70 enabling regions of interest containing anatomical structures, classified in a predetermined number N of categories.

For example, when the anatomical structures are bone structures, a number N=5 of categories is used, comprising the vertebras, the hips, the sacrum, the femoral heads and the femurs.

The detection and classification are performed using the same classification neural network, for example a RCNN neural network, trained beforehand on a generic database, non-specific to the same patient, to detect structures of N predetermined categories.

For each category $C_1$ of anatomical structures detected in the second two-dimensional image, steps $72_1$ to $72_N$ of estimating the first angle of rotation $A_{1,i}$ and of the second angle of rotation $A_{2,i}$ are applied.

A step 74 of stitching the estimations implements stitching of the first angles of rotation per class to calculate the estimated first rotation parameter ($A_{1,est}$) and a stitching of the second angles of rotation per class to obtain the estimated second rotation parameter ($A_{2,est}$).

For example, the stitch is a calculation of an average value or of a median value of the estimated values.

According to one variant, the image registration method includes a step of detecting anatomical structures in the second two-dimensional image by application of a first detection neural network to obtain regions of interest containing anatomical structures classified according to several structure categories, followed by a step of estimating the 6 parameters defining the rigid spatial transformation by application, for each anatomical structure category, of a second classification neural network trained for said anatomical structure category. Thus, a set of 6 estimated parameters per anatomical structure category is obtained. These sets are then stitched, parameter by parameter, to obtain an estimate of the 6 parameters of the rigid spatial transformation. For example, the stitch consists in calculating the average value or the median value for each estimated parameter.

Each used neural network is trained in a prior phase, on a generic database, independent of the patient.

Advantageously, the provided registration method allows automatically estimating parameters of a rigid spatial transformation to register the first image of a first modality and the second image of a second modality in the same reference frame, with a first neural network and at least one second neural network, without requiring any specific training of the neural networks on data of the patient.

Advantageously, the parameters of the used detection and/or classification neural networks are calculated during a prior learning phase, performed "offline", and are not specific to the patient but usable for all patients. The neural networks calculated this way are applied in an intraoperative phase without having to be updated or adapted to the patient.

Advantageously, the computing time and the number of data to be memorized to characterize the used neural networks are limited.

Although the present disclosure has been described with reference to one or more examples, workers skilled in the art will recognize that changes may be made in form and detail without departing from the scope of the disclosure and/or the appended claims.

The invention claimed is:

1. A method for registration between a first three-dimensional image acquired according to a first acquisition mode, and comprising anatomical structures of a patient, and a second two-dimensional image, acquired according to a second acquisition mode by an image acquisition device mounted on a scoping arch movable in rotation and in translation, the second image comprising a portion of the anatomical structures of said patient, the registration implementing a rigid spatial transformation defined by rotation and translation parameters, the method being implemented by a processor of a programmable electronic device and comprising:
automatic detection of the anatomical structures in the two-dimensional image by application of a first detection neural network trained on a generic database,
estimation, from the anatomical structures automatically detected in said second two-dimensional image, by application of at least one classification neural network trained beforehand on a generic database, of the rotation and translation parameters of said rigid spatial transformation, said estimation including:
a first estimation, from said anatomical structures automatically detected in said second two-dimensional image, by application of said at least one classification neural network, of a first angle of rotation and of a second angle of rotation of said rigid spatial transformation, characterizing the position of the scoping arch, and
a second estimation of translational parameters, of a third angle of rotation and of a zoom factor of said rigid spatial transformation, the second estimation using a result of the first estimation, and
3D/2D iconic registration between the first three-dimensional image and the second two-dimensional image starting from an initialization with said rigid spatial transformation.

2. The method according to claim 1, wherein the anatomical structures are classified into a plurality of predetermined anatomical structure categories, and wherein the estimation of the parameters of the rigid transformation includes the implementation of a second classification neural network per anatomical structure category to obtain transformation parameters estimated per anatomical structure category.

3. The method according to claim 1, wherein a classification neural network is applied per anatomical structure category to obtain a first angle of rotation and a second angle of rotation estimated per anatomical structure category, the method further including a stitching of the first angles of rotation estimated per anatomical structure category to obtain said estimated first angle of rotation, and a stitching of the second angles of rotation estimated per anatomical structure category to obtain said estimated second parameter.

4. The method according to claim 3, wherein each stitch consists of an average value calculation or of a median value calculation.

5. The method according to claim 1, wherein the second estimation comprises:
   a generation of a third two-dimensional image obtained from the first three-dimensional image by applying said first and second angles of rotation,
   an automatic detection of anatomical structures on said third image, and
   a pairing between the structures of said second and third two-dimensional images to obtain said translation parameters, the third angle of rotation and the zoom factor of said rigid spatial transformation.

6. The method according to claim 5, wherein the detection of anatomical structures in said third two-dimensional image is performed by application of said first detection neural network.

7. The method according to claim 1, wherein said anatomical structures are bone structures obtained on a second two-dimensional image acquired by fluoroscopy.

8. The method according to claim 1, wherein said anatomical structures are vascular structures obtained on a second two-dimensional image acquired by angiography.

9. The method according to claim 1, wherein the first three-dimensional image is acquired according to a first acquisition mode among tomography, MRI, 3D sonography or cone beam computed tomography.

10. A device for registration between a first three-dimensional image acquired according to a first acquisition mode, and comprising anatomical structures of a patient, and a second two-dimensional image, acquired according to a second acquisition mode by an image acquisition device mounted on a scoping arch movable in rotation and in translation, the second image comprising a portion of the anatomical structures of said patient, the registration implementing a rigid spatial transformation defined by rotation and translation parameters,
   the device including a processor configured to implement:
      automatic detection of the anatomical structures in the two-dimensional image by application of a first detection neural network trained on a generic database,
      estimation, from the anatomical structures automatically detected in said second two-dimensional image, by application of at least one classification neural network trained beforehand on a generic database, of the rotation and translation parameters of said rigid spatial transformation, said estimation including:
         a first estimation, from said anatomical structures automatically detected in said second two-dimensional image, by application of said at least one classification neural network, of a first angle of rotation and of a second angle of rotation of said rigid spatial transformation, characterizing the position of the scoping arch, and
         a second estimation of translational parameters, of a third angle of rotation and of a zoom factor of said rigid spatial transformation, the second estimation using a result of the first estimation, and
      3D/2D iconic registration between the first three-dimensional image and the second two-dimensional image starting from an initialization with said rigid spatial transformation.

11. A system for registration between a first three-dimensional image acquired according to a first acquisition mode, and comprising anatomical structures of a patient, and a second two-dimensional image, acquired according to a second acquisition mode, the system comprising:
   an image acquisition device mounted on a scoping arch movable in rotation and in translation, configured to acquire the second two-dimensional image, the second two-dimensional image comprising a portion of the anatomical structures of said patient, and
   a device for registration between the first three-dimensional image and the second two-dimensional image, the registration implementing a rigid spatial transformation defined by rotation and translation parameters, the device including a processor configured to implement:
   automatic detection of the anatomical structures in the two-dimensional image by application of a first detection neural network trained on a generic database,
   estimation, from the anatomical structures automatically detected in said second two-dimensional image, by application of at least one classification neural network trained beforehand on a generic database, of the rotation and translation parameters of said rigid spatial transformation, said estimation including:
      a first estimation, from said anatomical structures automatically detected in said second two-dimensional image, by application of said at least one classification neural network, of a first angle of rotation and of a second angle of rotation of said rigid spatial transformation, characterizing the position of the scoping arch, and
      a second estimation of translational parameters, of a third angle of rotation and of a zoom factor of said rigid spatial transformation, the second estimation using a result of the first estimation, and
   3D/2D iconic registration between the first three-dimensional image and the second two-dimensional image starting from an initialization with said rigid spatial transformation.

* * * * *